Nov. 12, 1957 J. A. BRUSTMAN ET AL 2,813,150

CARD TO TAPE PERFORATOR

Filed July 27, 1953 6 Sheets-Sheet 2

Nov. 12, 1957 J. A. BRUSTMAN ET AL 2,813,150

CARD TO TAPE PERFORATOR

Filed July 27, 1953

6 Sheets-Sheet 3

Nov. 12, 1957 J. A. BRUSTMAN ET AL 2,813,150

CARD TO TAPE PERFORATOR

Filed July 27, 1953 6 Sheets-Sheet 5

United States Patent Office 2,813,150

Patented Nov. 12, 1957

2,813,150

CARD TO TAPE PERFORATOR

Joseph A. Brustman, Narberth, Pa., and David L. Noble, Rowayton, Conn., assignors to Sperry Rand Corporation, a corporation of Delaware Application July 27, 1953, Serial No. 370,454

18 Claims. (Cl. 178—26)

This invention in general pertains to means for sensing data contained in a particular medium in a certain code form and converting the sensed data into another code form and into another medium. It is particularly concerned with sensing data, represented by particular code combinations in record cards, and transcribing the sensed data into tape in telegraph printer code.

The various codes used in record cards usually have one set of permutations for numeric characters and another set for alphabetical. The telegraph printer code, however, uses a five hole combination code and the permutations for numeric characters are the same as those for alphabetical and, where there is a shift from one type of character to the other, the shift is indicated in the tape by a particular permutation signal. The code signal is of a particular combination to indicate a change from alphabetical characters to numeric, and is of another combination to indicate the reverse.

While the system of the present invention might be adapted to accommodate various card codes and to transcribe them in tape after translation into the telegraph printer code, however, the invention is here illustrated as serving to transcribe information from a 90 column statistical tabulating card to the telegraph printer tape while using a standard six hole combination code on the cards and standard telegraph printer code on the tape. In general, the invention comprises means wherein record cards bearing data in code perforations are subjected to a light sensing device and, upon sensing taking place, the character represented by the code perforations is decoded. The decoded character is then translated into telegraph printer code and subsequently punched in a tape. When the data sensed from the card shifts from numeric characters to alphabetical, or the reverse, a shift signal is required to be punched in the telegraph printer tape to indicate that the succeeding character to be punched in the tape will be of a different nature. Where this is the case, switching devices are provided whereby the punching of the new character in the tape is automatically delayed until after a signal indicating the nature of the change is first automatically punched into the tape.

A plugboard is provided whereby it is possible to enter a variety of signals in the tape which are not contained in the tabulating cards. These signals are created automatically when a pre-selected column of a card reaches the sensing station. The column is selected by plugging up a circuit at that particular columnar position.

The entry of the automatic additional signals through the plugboard is controlled by special perforations in the card being sensed at that time.

A feature of the invention is its high speed of operation, which is accomplished by various electronic elements and their particular cooperative association with one another.

Another feature of the invention, which materially aids in its speed of operation, is a circuit arrangement providing for automatic indication of the shift signal where data coded in a particular numeric-alpha code in record cards is transcribed in telegraph printer code in a tape.

The invention described herein has the advantages of a light sensing means, an electronic decoder and translator, and a variety of electronic switching devices, all associated with one another in a simple manner providing for high speed and simplicity in transcribing data from conventional record cards to telegraph tape.

A general object of the invention is, therefore, to provide an efficient card to tape conversion method and means.

Another object of the invention is to provide a card to tape conversion device incorporating electronically controlled automatic character shift signal means.

A further object of the invention is the provision of a plug-board and associated control circuits by which data, not contained in a card being sensed, is entered in a tape.

Another object is the provision of a control circuit whereby on a signal from a card, data not entered therein may be entered through the circuit set up in a plugboard.

The invention further lies in the particular arrangement of the various elements and in their cooperative association with one another to produce efficient card to tape transcription.

The foregoing objects and advantages of the invention, as well as its many features and other points, will become apparent as the specification unfolds in greater detail and as it is read in conjunction with the accompanying drawings, forming a part of this application.

Figure 8:
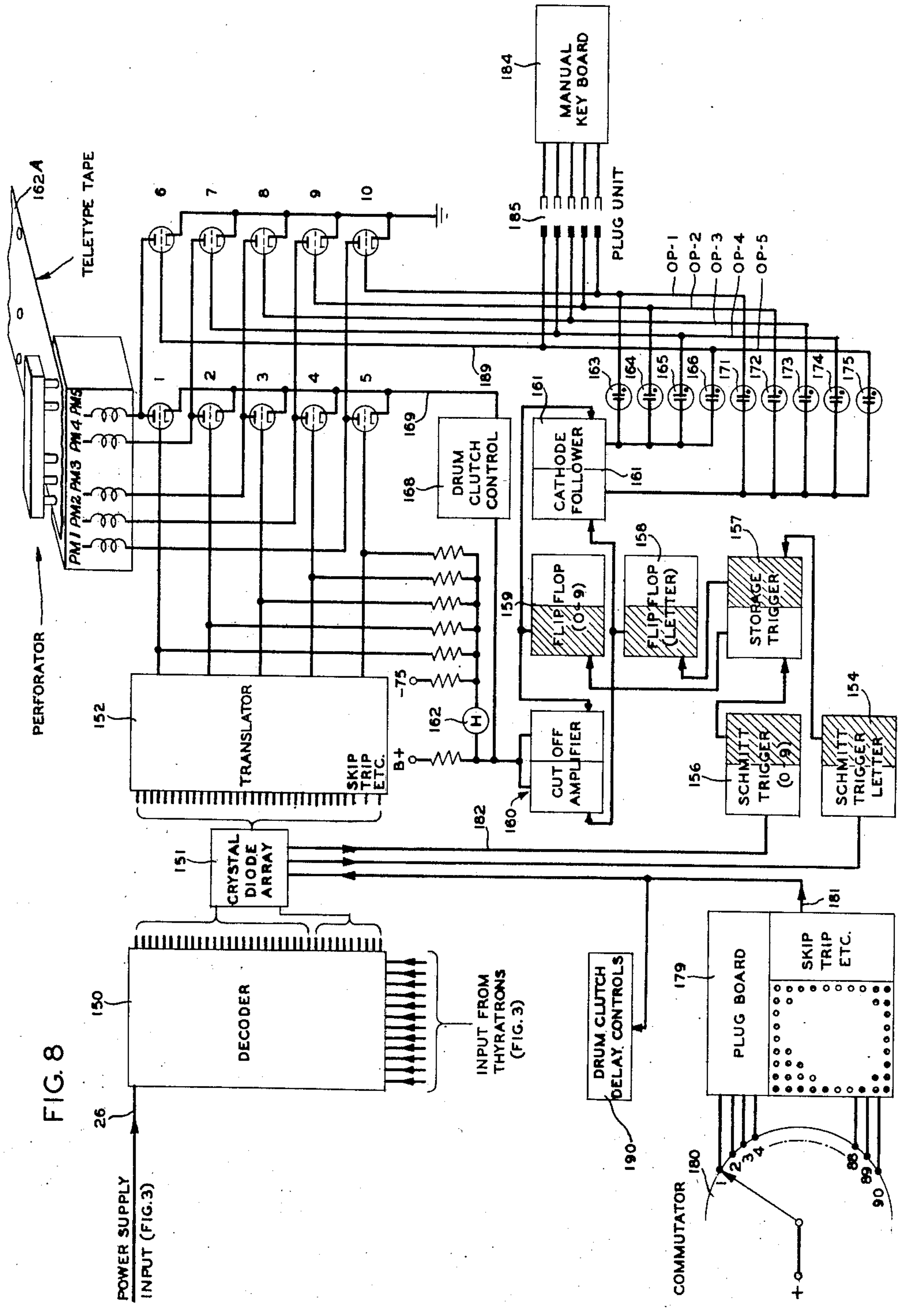

Fig. 8 comprises a schematic diagram of a further form of the invention, and

Figures 1, 2, 9:
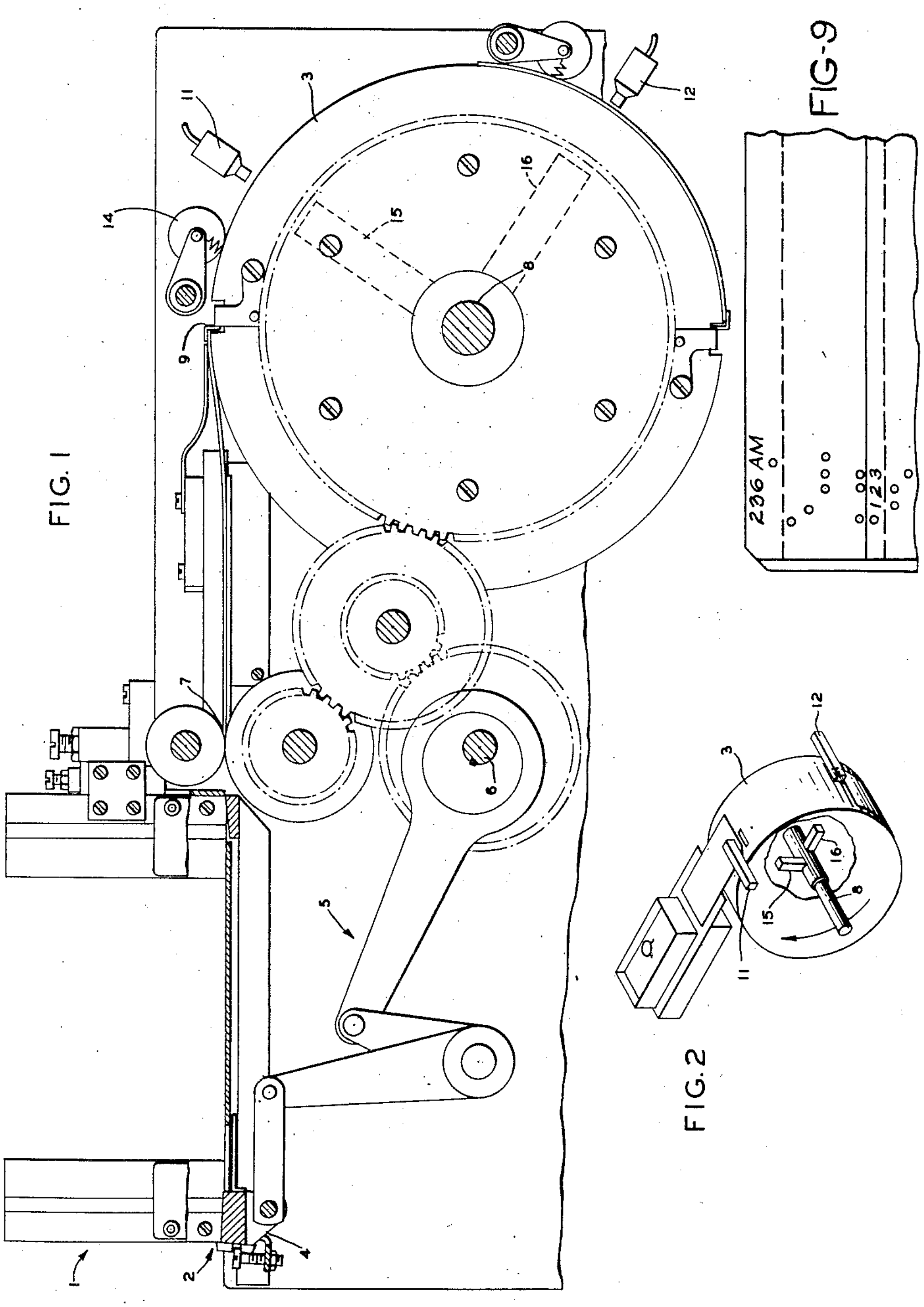
Fig. 1 is a side view, partly in section of the sensing mechanism and includes a sensing drum and a card feed mechanism.
Fig. 2 is a greatly simplified view showing the general arrangement of the sensing mechanism with respect to the drum.

Fig. 9 shows a portion of a standard tabulating card.

In describing the invention in detail, standard stacked record cards are fed lengthwise from a card magazine 1 by suitable picker means, generally indicated at 2, onto the periphery of a rotating sensing drum 3. The picker knife is mounted on a movable base 4, and it is moved into engagement with the bottom card of the stack by means of a suitable oscillating mechanism 5 mounted on an eccentric hub 6. When the picker knife is moved toward the rear of the machine, it engages the bottom card of the stack and carries it through a throat to a pair of rollers 7. The latter move the card on to the periphery of the drum 3 into position for sensing. The drum is continuously rotated by a shaft 8 geared to the card feed mechanism and, as the drum rotates clockwise to a position just prior to that shown in Fig. 1, a clamp 9 is held in disengaged position by suitable cam mechanism not shown. As soon as the leading edge of the card is forced under the clamp by the rollers, the clamp is rotated about a pivot 10 in such manner as to retain the card on the drum for a time sufficient for it to pass through a pair of stationary sensing stations 11, 12. While on the drum, the card is pressed against the periphery thereof by suitable rollers 14. The rotating drum with the card retained thereon passes first through one sensing station and then the other. The sensing stations are spaced apart a suitable distance from each other and are mounted in suitable manner just above the drum. Each sensing station consists of a single row of six photocells, one cell being assigned to each data designation or index position of a card column. The two sensing stations are spaced a card length apart in such manner that the columns 1 to 90 of the card are sensed consecutively; that is, first the six index positions of each column, 1 through 45, of the upper zone of the card and then the six index positions of columns 46 through 90 in the lower zone of the card. Suitable light sources 15 and 16 (Fig. 2) are mounted within the sensing drum on shaft 8. The rotating drum is equipped with two slotted apertures that match the six index positions of the upper half of the card, permitting light to pass from the related source to the associated six photocells through the columnar perforated index positions.

Figure 3:
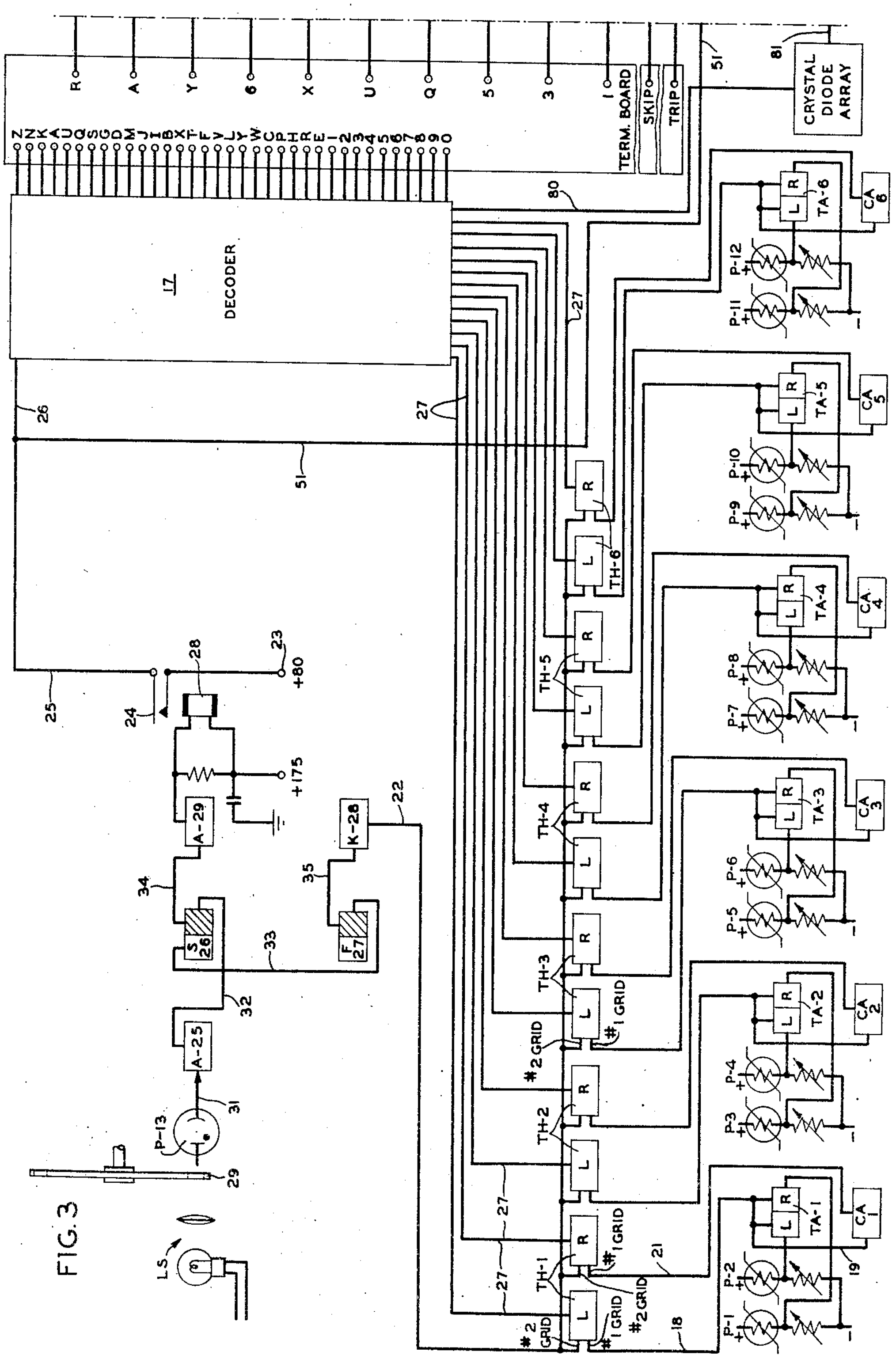
Fig. 3 is a schematic diagram of the sensing and decoding means.
Figure 4:
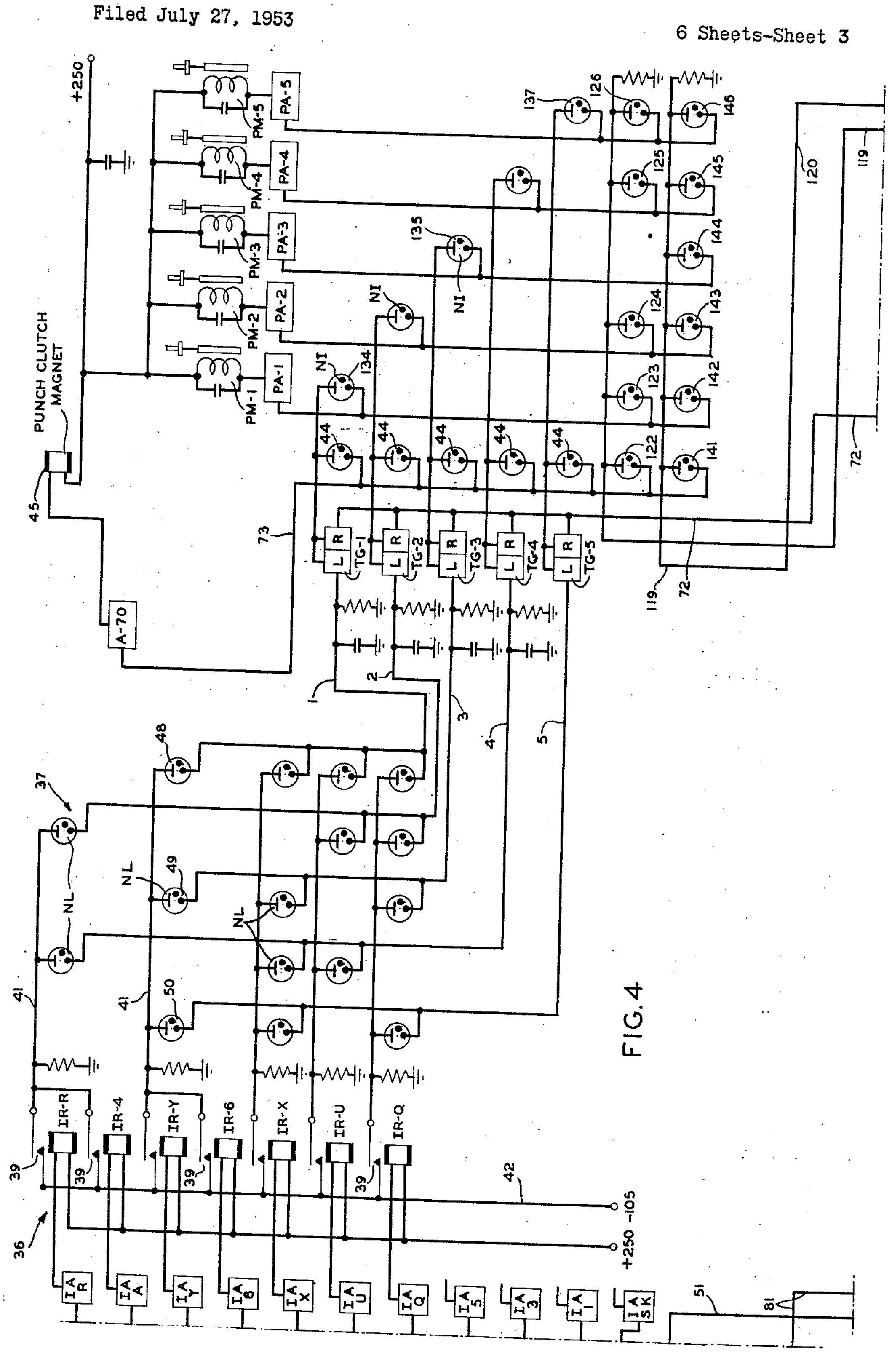
Fig. 4 is a schematic diagram of the translating and tape punch control means.
Figures 5, 6:
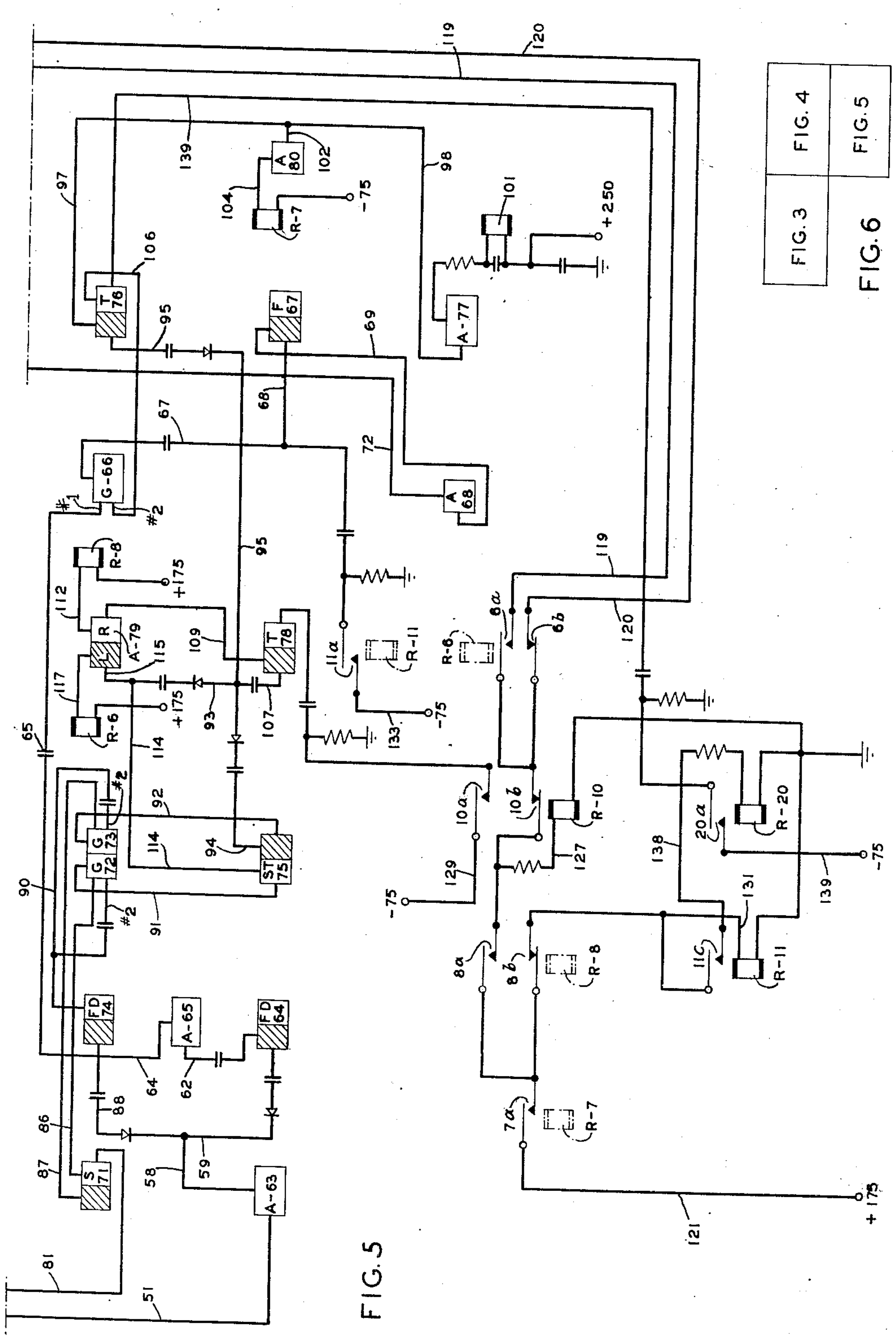
Fig. 5 is a schematic diagram of the shift control means.
Fig. 6 is a block layout of Figs. 3–5.

Now referring to the various circuit diagrams, particularly Figs. 3–5, the six photocells of the first sensing station are indicated by the odd numbered cells P–1 to P–11; the six photocells comprising the second sensing station are identified by the even numbered cells P–2 to P–12. Since the cells of each sensing station are used at different periods of time in sensing a particular zone of a card the cells representing the same index position are grouped in pairs. Each pair of cells, comprising one cell from each sensing station representing the same data index position of a card, are connected in parallel. The first pair of parallel connected cells P–1 and P–2 represent the first data index position; the second pair, the second, and so on.

Whenever a card column is sensed, a plurality of circuits are closed through a plurality of switches to a decoder 17. The decoder shown in box symbol form is of a suitable type and may be any one of a number of types, such as a system of relays, an array of neon lamps, or a rectifier network including a plurality of rectifier elements associated with a plurality of pairs of switches. The latter type is well known and disclosed in the U. S. Patent 2,476,066 to Rochester. A crystal diode decoder of this nature is employed here. The switches employed here are thyratrons grouped in six pairs TH–1 to TH–6. Each pair is identified with a particular one of the six possible card index positions of a card column. One or the other thyratron of each pair is caused to fire upon the sensing of one of the six index positions of a card column. If a hole is sensed at an index position the right thyratron R of a pair conducts; if no hole is sensed, the left thyratron L of the pair conducts. Selection of one or the other thyratron of a pair for conduction is controlled by a twin amplifier and a cut-off amplifier associated with each index sensing position. The twin amplifiers TA–1 to TA–6 and the cut-off amplifiers CA–1 to CA–6 are identified by numerals corresponding to the data index position which they represent. The input of the right half R of each twin amplifier is connected to a photocell such as P–1 of the first sensing station, and this half of each amplifier functions only when the cells of the first sensing station are employed in the sensing operation. The input of the left half L of each twin amplifier is connected to a photocell such as P–2 of the second sensing station, and this half likewise does not function except when the cells of the second sensing station are being utilized. Until cut off, the cut off amplifiers CA–1 to CA–6 are conducting.

In describing the operation of the sensing, should light fall on either of the photocells of a pair, say for example photocell P–1 or P–2, the corresponding half of the related twin amplifier TA–1 will be activated to cause a decrease in its plate potential and a negative charge to be placed over a line 18 onto the #1 grid line of the left thyratron L of pair TH–1. A negative charge will also be carried over line 19 to drive the grid of cut-off amplifier CA–1 negative and thereby cause an increase in its plate potential. With the latter action a positive potential is placed over line 21 onto the #1 grid line of the right thyratron R of pair TH–1, conditioning this right thyratron for conduction. Similar action will occur in the other sensing circuits with respect to their related thyratrons if a card hole is sensed. If, because of the absence of a hole in the related index position, no light falls on either photocell P–1 or P–2, neither section of the related twin amplifier TA–1 will be activated and, it is clear, a positive potential will continue on the #1 grid of the left thyratron L of pair TH–1, conditioning it for conduction. Further, the cut-off amplifier CA–1 will not be cut off and a negative potential will continue on the #1 grid to block conduction in the right thyratron of the pair. Similar action takes place in the circuits of each of the other pairs of thyratrons if no hole is sensed in the related index position. It can now be seen that six thyratrons, one from each pair, will be conditioned for conduction each time a card column is sensed by either sensing station. Of these six, those which are right thyratrons R indicate holes to have been sensed in the related index positions, and those which are left thyratrons L represent those index positions in which a hole was absent.

Conduction in the conditioned thyratrons is effected by a short synchronizing positive pulse from a source of light LS and transmitted through various electronic devices and over a line 22 common to the #2 grids of all the thyratrons. The plate supply to all thyratrons is provided from a supply source 23 through a pair of relay contacts 24, lines 25, 26, decoder 17 and the various plate lines 27. Relay contacts 24 are controlled by a suitable relay 28, the energy to operate which is timed from the light source LS. The synchronizing pulse to the #2 grids of the thyratrons and the energy controlling the operation of relay 28 is generated by light source LS transmitting light through a series of slots about a rotating disc 29 to a photocell P–13. Rotation of the disc is synchronized with the card feed in such manner that a different disc slot or aperture permits light to fall on the P–13 whenever a card column is in sensing position in either the first or second sensing station. This short duration pulse is picked up in photocell P–13, carried by a line 31 and amplified in an amplifier A–25 from which it is fed over a line 32 to the right valve of a Schmitt trigger S–26 causing the latter to shift conductance from its normal right side to the left. With the latter action, a negative pulse is transmitted over a line 33 to the right valve of a flip-flop circuit F–27, and a positive pulse is sent over a line 34 to an amplifier A–29 causing it to energize relay 28. The latter action causes contacts 24 to close the plate supply line to all thyratrons. The negative pulse fed by the Schmitt trigger S–26 over line 33 to the flip-flop circuit F–27 actuates the latter to place a positive potential over the line 35 to the grid of a cathode follower K–28, from which a positive synchronizing pulse is fed over the cathode line 22 to the #2 grid of all twelve thyratrons. With this action those six thyratrons, one from each pair, will become conductive whose #1 grids have been rendered positive during the sensing operation; conduction in the remaining six thyratrons will be blocked. The conducting thyratrons will remain conductive as long as light from the source LS falls on the cell P–13. The thyratron plate circuits will be broken as disc 29 rotates to its next slot; the light source to the photocell is broken by a dark space separating each slotted aperture.

The decoder or function table 17 here accommodates all characters of the six-hole combination code employed and, as previously stated, is interposed between the plate power supply and the individual plates of the twelve thyratrons. Sensing of any code combination will, through the thyratron switches, and in well known manner through the decoder, permit the potential of one output line in the function table to rise above all others. This line is called a selected line and represents the character coded in the particular column sensed in the record card. For each character of the original code a particular output line from the function table will be selected. The various lines which may be selected are connected to individual terminals of a terminal board, and each terminal is identified by the alpha or numeric character which it represents. The terminal board is used merely to facilitate wiring. A line that has been selected maintains its increased potential until the plate supply to the thyratrons is broken.

*Translation to telegraph printer code*

A suitable translator generally indicated at 36 (Fig. 4) is provided for translating or converting characters elicited by the decoder into telegraph printer code. The converted characters are then transcribed by punchings into a tape. To this end, the right side of the terminal board is provided with a plurality of input terminals to the translator, each identified by a character corresponding to a selected output terminal line of the decoder to which it is wired. For simplicity all output terminals have not been shown. Each translator input terminal is connected, through a separate amplifier identified by the letters IA and the character of the terminal it represents, to a separate relay. Each of the latter relays is identified by the letters IR and the character it represents. Each IA amplifier is normally biased to cut-off, and only the one amplifier and associated relay pertaining to any line that is selected by the function table of the decoder will become effective.

The translator comprises a neon tube matrix, generally indicated at 37, which functions to code the original alphabetical and numerical characters into the combinations of the telegraph printer code. The matrix includes, to effect the code combinations, five output lines 1–5 and an array of connected neon lamps or diodes NL. Each IA amplifier and IR relay when energized controls the operation of a certain combination of the neon lamps, in accordance with the tape code whereby a corresponding combination of the output lines 1–5 is energized. Here again a few of the input terminals connecting into the neon matrix 37 are shown so as not to unduly amplify the drawings, since the manner of arranging the balance of the input terminal leads into the matrix and the balance of the neon matrix in accordance with the telegraph printer code combinations is clear from what is shown and described herein. Each output line feeds into a separate dual or twin triode electronic gate, identified by the letters TG and a numeral corresponding to the related connecting matrix output line. The plates of each gate are connected in parallel, and both anodes in each gate are normally conducting with zero grid potential.

Upon tripping of any of the IR relays by a selected line at the terminal board, a pair of contacts 39 in one of the matrix input lines 41 closes. There is a pair of contacts 39 and a matrix input line 41 associated with each character input terminal, and in each matrix line there is one or more neon lamps NL connecting the input line 41 to one or more of the matrix output lines 1–5 corresponding to the printer code combination of the related terminal board character. On closing of a pair of contacts 39, a potential is transmitted over the negative supply line 42, contacts 39 closed by the energized relay, through the associated connecting neon lamps NL, over certain of the outgoing lines 1–5 according to the character coded, and to the control grids of the left half L of the associated dual gates TG, whereby current flow through the left half L of the latter is blocked. The twin gates TG control through certain neon isolators NI and punch amplifiers PA–1 to PA–5 the functioning of tape punch magnets PM–1–5, and also control through neon isolators 44 positioned in the vertical row at the left, and amplifier A–70 the Teletype punch clutch magnet 45.

If, for example, the coded record card character had been the digit "6"; the input amplifier IA–6 and the related relay IR–6 will be effected, causing neon devices 48, 49 and 50 in the related matrix line 41 to function and to energize the outgoing lines 1, 3 and 5. This action will block conduction in the left half L of twin gates TG–1, 3 and 5.

Cutting off the plate currents in the left half L of any of the twin gates is insufficient to cause any of the neon isolators NI or those designated 44 to function until the current drain through the right half R of the gate is also cut off. To the latter end and at the proper time, all the right sections of the twin gates receive a negative synchronizing pulse effective to cut off these sections. The plate potential of only those twin gates whose both halves have been cut off will rise to the supply voltage to cause the related neon isolators NI and 44 to pass an operating voltage to the associated tape punch magnets and to the punch clutch magnets.

Figure 7:
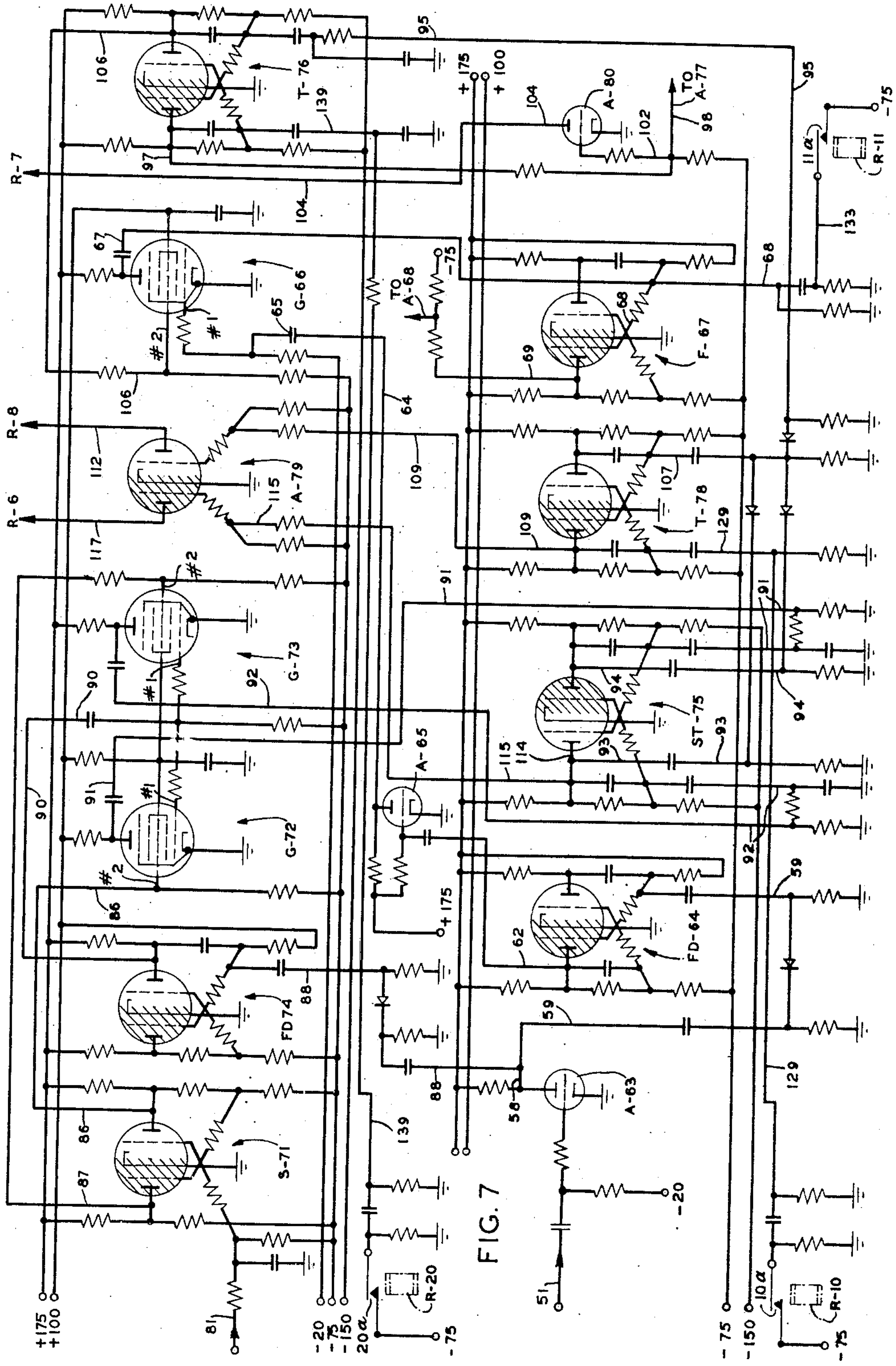
Fig. 7 is a more detailed wiring diagram of the automatic shift control means.

Reference is now directed to both Figs. 3 and 7. Fig. 7 is a more detailed wiring diagram of the synchronizing pulse circuit and of the circuits involved in the character shift functions later to be described. The synchronizing pulse to the right sections of the twin gates is timed from the light source LS and is taken over lines 25 and 51 on closing of relay contacts 24. It is passed through an amplifier A–63 (Figs. 5, 7) and over lines 58 and 59 to cause a delay flip-flop circuit FD–64 to temporarily shift its conductance and to further function to transmit over line 62 through an amplifier A–65, plate line 64 and condenser 65 a delayed positive potential to the #1 grid of a gate G 66. The latter thereupon passes a potential over its plate line 67 to the control grid line 68 of the left valve of a flip flop circuit F–67, causing the latter to temporarily shift conductance to the right and to transmit a positive potential over its plate line 69 to an amplifier A–68. From the latter a negative potential is transmitted over plate line 72 (Figs. 4, 5) to the grids of the right halves of all twin gates TG–1 to 5, thereby cutting off their plate currents and initiating a current flow through the neon isolators NI and 44 associated with those twin gates the left halves of which have also been cut off by potentials over the neon matrix lines 1–5. The current flow through the isolators 44 is carried over the line 73 to the amplifier A–70 to effect operation of the punch clutch magnet 45. The current flow through the isolators NI is carried to the associated punch magnet amplifiers PA–1 to PA–5 to effect operation of the proper punch magnets to punch the coded character signal in the telegraph tape.

*Automatic shift signal action*

The above action takes place when there is straight card to tape transcription of a signal without any intervening shift signal action taking place. Assume, however, that there is a change in the card sensing from one type of character to the other. In this case a shift signal is required to be punched in the tape prior to the punching of the new character. This operation requires the following steps:

(1) Stopping of the record card sensing drum;

(2) Insertion by punch of the proper shift signal in the tape;

(3) Punching the tape with the new character sensed and decoded from the perforated card; and (4) Restarting the sensing drum.

To enable the shift signal, all numeric characters are connected by separate lines 80 through a suitable array of unidirectional crystal diodes (Fig. 3), to a figure shift signal transmission line 81, and each time a numerical character is sensed the decoder output line selected will not only carry a positive potential to the related IA amplifier wired to the selected line terminal at the terminal board, but will also send a positive pulse through the crystal diode array to the figure shift line 81.

The shift line 81 Figs. 3–7 operates a Schmitt trigger S–71, which in turn controls a pair of gate valves G72 and G73, the first controlling alphabetical shifting and the other controlling numerical shifting. Trigger S–71 is normally conducting on its left side and holds the alphabetical gate G72 normally open and the numerical gate G73 normally closed. A shift in conductance of trigger S–71 from left to right serves to close the alpha gate and to open the numerical gate. Opening of the latter on a change of sensing serves to effect a consequent shift signal punch operation in the tape to indicate a change from alphabetical sensing to numerical sensing; and a subsequent opening of the alphabetical gate will effect a punching in the tape to indicate a change from numeric to alpha in the character sensed. How this happens and the circuits involved may be better understod by tracing an example through the circuits.

Now assume the previous sensing to have been alphabetical and the next sensing that takes place is numerical. With the latter action, a numerical output line corresponding to the numerical character sensed, which we will say is a "6," is selected by the decoder. Thereupon, a positive pulse is transmitted across the terminal board to the related IA–6 amplifier; a positive pulse is also sent through the crystal diode array to the figure shift line 81.

The IA–6 amplifier upon being activated effects the energization of relay IR–6. The latter closes its contacts 39 in the related matrix line 41 causing conduction through the related neon discharge devices 48, 49 and 50 to energize the 1—3—5 output lines representing the numeral "6" in telegraph printer code. Lines 1—3—5 carry a current flow to block conduction in the left sides of the twin gates TG–1, 3 and 5. The corresponding punch magnets PM–1, 3 and 5 and the punch clutch magnet 45 cannot, however, function until conduction in the right sides of twin gates TG–1, 3 and 5 is also blocked. Blocking of the right sides of all the twin gates would happen in the ordinary course of events by action of the synchronizing pulse that comes through the relay contacts 24 and over line 51, but the synchronizing pulse is blocked and lost in the automatic shift operation by the timely closing of gate G–66 through effects caused by the pulse transmitted over the numeric line selected by the decoder and which is passed through the crystal diode array and figure shift line 81 to the Schmitt trigger S–71. Blocking of the synchronizing pulse to the right halves of twin gates TG–1 to 5 serves to hold or delay the coded character signal in the neon matrix 37 until after tripping of the punch magnets required to effect punching of the shift signal in the tape.

In effecting the closing of gate G–66 and punching of the shift signal, the pulse over the figure shift line 81 triggers tube S–71 in the opposite direction effecting a negative potential over plate line 86 to a grid #2 of alpha gate G72 and a positive potential over line 87 to #2 grid of numerical gate G73. A synchronizing pulse over line 51, amplifier A–63, lines 58 and 88 and through a delay flip flop FD–74 actuates the latter to send a delayed positive pulse over a common line 90 to the control grids of both gates G72, G73, whereupon the alpha gate G72 is closed and the numeric gate G73 opens. The pulse through FD–74 was delayed sufficiently to permit gate G72 to become blocked by the action of trigger S–71. The plates of gates G72 and G73 are respectively connected by lines 91 and 92 to the left and right control grids of a storage trigger ST–75 which is now conducting on its right side. A synchronizing pulse passing through gate G72 or G73, as the case may be is applied to opposite sides of the shift storage trigger ST75. A change from alphabetical to numerical characters or vice versa will cause tube ST–75 to trigger in the opposite position. Opening of gate G73 causes a negative potential over line 92 to the right control grid of trigger ST–75 causing it to shift its conductance to the left side. With this action, a negative potential from the left plate of tube ST–75 is carried over lines 114, 93, and 95 to the left valve of a trigger T–76, identified as the card feed drum clutch trigger, causing it to shift its conductance from left to right. This action activates over lines 97 and 98 an amplifier A–77 (Fig. 5) to energize the card feed drum clutch magnet 101 to stop further rotation of the card drum; it also activates over lines 97 and 102 an amplifier A–80 to energize over line 104 a relay R–7. The trigger action in tube T–76 further transmits a negative potential over the line 106 to a #2 grid of gate G–66 to block the same. The synchronizing pulse from the light source LS to the control grid of gate G–66 was delayed by the flip flop circuit FD–64 sufficiently to enable gate G–66 to become blocked or closed to it by the action of trigger T–76. A negative potential from the left plate of storage trigger ST–75 is also transmitted over lines 114, 93, and 107 to a trigger T–78, shifting its conductance from the left to its right side and sending a positive potential over a line 109 and through the right side of a twin amplifier A–79 to energize a relay R–8 over plate line 112. The trigger action in tube ST–75 further sends a negative potential over lines 114 and 115 and through the left side of an amplifier A–79 to deenergize over plate line 117 a relay R–6.

Upon the blocking of gate G–66, energization of relays R–7 and R–8 and the stopping of the card sensing drum, a sequence of events follows effecting first, a punching in the tape of a signal indicating the numeric shift, next, a punching of the coded character in the tape, and then restarting of the drum for the next sensing operation. Relays R–7 and R–8 when energized, control the energization of a numeric signal shift line 119 (Figs. 4, 5) which controls the operation of punch magnets PM–1, 2, 4 and 5. Relays R–6, R–7 and R–8 when energized control the energization of an alpha signal shift line 120 controlling the operation of punch magnets PM–1, 2, 3, 4 and 5. Energized, relays R–7 and R–8 close their "*a*" contacts and open their "*b*" contacts, whereupon a circuit is established over the positive line 121, now closed contacts 7*a*, 8*a*, 10*b* and now closed contact 6*a*, numeric line 119 and neon isolators 122, 123, 124, 125 and 126 respectively controlling the punch clutch magnet 45 and the punch magnets PM–1, 2, 4 and 5, to effect a signal punch in the tape indicating a shift from alpha to numeric sensing.

The next action that occurs effects punching in the tape in telegraph printer code the numeric character "6" that had been sensed and which is now stored in the coding matrix. Action of relays R–7 and R–8 establishes a further circuit over positive line 121, now closed contacts 7*a*, 8*a*, line 127 and resistance 127′ to energize a relay R–10, which opens its normally closed contact 10*b* to deenergize the numeric line 119. The resistance 127′ is sufficient to slow up the operation of relay R–10 long enough to permit the circuit traced above through contact 10*b* to be completed before it is broken. With the energization of relay R–10, contact 10*a* closes in a negative supply line 129 to trigger back to its left side trigger T–78 now conducting on the right, whereby a cut-off potential is applied over line 109 to the right side of amplifier A–79, and thereupon relay R8 is deenergized. Contact 8*a* thereupon reopens to deenergize relay R–10, and a contact 8*b* recloses to energize a relay R–11 by a circuit over positive line 121, closed contacts 7*a* and 8*b*, line 131 and the winding of relay R–11 to ground. Relay R–11 also closes a contact 11*a* and provides a negative potential over the lines 133, and 68 to temporarily trigger the flip flop F–67 from the left to the right. This action sends a positive potential over line 69 to activate amplifier A–68 and to establish a negative potential over the line 72 to cut off conduction in the right half R of all the twin gates TG–1 to TG–5. The parallel connected plates of those twin gates TG–1, 3 and 5, in which conduction in the left half had been blocked by the numeric character "6" now stored in the matrix output lines 1, 3 and 5, will now rise in potential sufficient to effect a flow of current through the neon isolators 44 to energize the punch clutch magnet 45 and a flow of current through the neon isolators 134, 135 and 137 to effect operation of the punch magnets PM–1, 3 and 5 to punch the code for the numeric character "6" in the tape.

The next action that occurs releases the drum clutch to again rotate the card sensing drum. A contact 11c, closed by relay 11, establishes a circuit over positive line 121, contacts 7a, 8b, 11c and line 138 through resistance 138a to energize a relay 20. The latter closes a contact 20a in a negative supply line 139 to restore conduction in trigger T–76 to its left side. The latter action sends a positive pulse over plate line 106 to the #2 grid of gate 66 to unblock the latter so as to permit it to pass any subsequent synchronizing pulse from the light source LS. Restored trigger T–76 also sends a negative pulse over plate line 97 to cut off the amplifiers A–77 and A–80, whereupon relay R–7 is deenergized and the circuits to relays R–11 and R–20 are reopened, and the drum clutch magnet 101 is deenergized to again permit rotation of the card sensing drum.

The sensing drum now starts to carry the next card column into sensing position and, as it does so, the disc 29 rotates to bring its next slot before the light source LS. In doing so, the light to the photocell P–13 is momentarily blocked, causing relay R–28 to deenergize and open the plate circuit to all the thyratrons, effecting restoration of trigger S–71 and gates G–72 and G–73. Trigger ST–75, however, does not restore and will continue to conduct on the left or numeric side until a synchronizing pulse from the delay flip flop F–74 is passed through the alpha gate G–72.

Now, should the next card column sensed also contain a numerical character, the pulse over the figure shift line 81 will again trigger tube S–71 to the right which will again close gate G–72 and open gate G–73. The storage trigger ST–75, however, is not further affected by the synchronizing pulse through FD–74, since it is already conducting on its numeric or left side, and thereupon the digit sensed will be punched directly into the tape without any intervening shift operation delay.

However, should the next card column present an alphabetical character for sensing, the synchronizing pulse from the light source LS and through the delay flip flop FD–74 will pass through the open gate G–72 and trigger the storage trigger ST–75 back to its right side. This action actuates the amplifier A–79 L over lines 114 and 115 causing relay R–6 to reenergize. It also shifts conduction in trigger T–78 over lines 94, 95 and 107, and trigger T–76 over lines 94 and 95 so as to effect the consequent energization of relays R–7 and R–8 and the drum clutch magnet as before. This time the alpha line 120 is energized through contacts 7a, 8a, 10b and 6b to energize neon isolators 141 to 146. This effects operation of all of the punch magnets PM–1–2–3–4 and 5 causing punching of a code signal in the tape, indicating a shift in the sensing operation from numeric to alpha character. Similar encoding circuits close as before to energize relays R–10, R–11, and R–20 to effect punching in the tape of the alphabetical character sensed and the subsequent resetting of the various triggers as before.

In Fig. 8 is shown a further form of the invention, wherein the manner of providing the automatic shift signal is modified. Here, as in the above form, during the sensing of any character only one terminal line of the decoder circuit 150 will be selected having a higher potential than the others. The output of the six hole decoder 150 is fed through an interconnecting crystal diode array 151 to the input of a five hole teletype translator 152, which in turn translates the various decoded characters into the five hole telegraph code. The output of the translator is directly coupled to the grid lines of output triodes or perforating amplifiers 1, 2, 3, 4 and 5 which in turn supply power to the tape perforating magnets PM–1, PM–2, PM–3, PM–4, and PM–5. All alpha terminal lines from the decoder connect by way of the crystal array to a Schmitt trigger 154; all numeral terminal lines also connect by way of the crystal array to a Schmitt trigger 156.

Energization of either a figure or any alpha select line will result in a narrow pulse to a grid of a storage trigger 157. One plate of trigger 157 is A. C. connected to a flip flop 158 called the alpha flip flop, the other plate is A. C. connected to another flip flop 159 called the figure flip flop. The out-put of each of these flip flops is directly connected to an overbiased cut-off amplifier 160 and to a cathode follower 161. This part of the circuit operates as follows:

Let us assume a letter character had been sensed previously and is now followed by a figure so that a shift signal is required to be punched in a teletype tape 162A before the coded character is punched, so as to indicate a shift from letter sensing to figure sensing. Sensing of the figure will cause a high potential on the decoder output terminal of the line selected. This voltage rise would normally be translated by the translator 152 and reach the proper grids of the five output tubes 1–5 but, before perforating can take place, which takes a number of milliseconds, the automatic shift insertion circuit will start operating. The positive potential over the selected figure line will energize over line 182 the figure Schmitt trigger 156 which in turn triggers the storage trigger 157 to the left. The negative output from the latter will go to the figure flip flop 159 which in turn will cause the following actions.

A positive voltage will be applied to the right grid of the cut-off amplifier 160. The plate potential of this amplifier will decrease and the potential between the plate of the cut-off amplifier and the common grid leak points of tubes 1 to 5 will be lowered. The neon tube 162 will extinguish, thereby causing complete cut-off of the perforating amplifiers 1 to 5. At the same time the the positive voltage from the figure flip-flop 159 will cause a voltage rise in the cathode circuit of the cathode follower 161 right side. The four neon tubes 163–4–5–6 connected to output lines OP–1, 2, 4, and 5 will fire, thereby applying a positive potential to four of five output shift signal amplifiers namely 6, 7, 9 and 10. These are connected to punch magnets PM–1, 2, 4 and 5 which will energize and effect punching of the figure shift teletype code combination in the tape 162. A moment later the figure flip flop 159 returns to normal position. With this action the amplifier 160 and cathode follower 161 are cut off, whereby the diode gaseous discharge devices 163–6 extinguish and the diode element 162 again fires to establish normal potential on the perforating amplifier tubes 1–10. Since a signal from the translator is still applied to certain ones of the amplifier tubes 1–5, the correct figure code will then be finally perforated in the tape.

During all this time the synchronizing disc, such as 29 in Fig. 3, and the punch card drum have been held stationary. In this form of the invention a single revolution drum clutch control 168 is provided, which does not operate to execute another revolution until energized by a circuit completed on the firing of one or more of the signal amplifier tubes 1–5 connected to the common cathode line 169. Hence, current through the tubes 1–5 releases the drum clutch control to advance the punch card by one column. Advancing of the punch card causes the apertured disc 29 to revolve to position its next aperture between the light source LS and the photocell P–13 (as in Fig. 3) advancing of the apertured disc as related above blocks the light to the photocell P–13. This in turn causes deenergization of all thyratrons connected to the diode matrix 150. Sensing of additional figures in succeeding columns of the record card will, it is clear, be directly perforated into the tape without delay.

Now, should an alpha character follow, this time the letter Schmitt trigger 154 will be caused to trigger the storage trigger 157 back to the right. This action affects the alpha flip flop 158, which in turn affects the cutoff amplifier 160 in a manner as previously described, and also activates the cathode follower 161 but this time on the left side. The left side of the cathode follower 161 controls the five alpha shift neons 171–175 and the associated tubes 6 to 10. Upon energization of the latter the alpha shift signal code combination 1–2–3–4–5 is caused to be punched in the tape.

By means of a suitable plugboard 179 (Fig. 8) it is possible to insert a variety of signals into the tape at predetermined columns of the punched card. Such signals may be inserted in the tape although they are absent from the tabulating card. This control is enabled by means of a commutator 180 synchronized for rotation with the card sensing drum and having taps, one for each column of the card, each tap being adapted for plugable connection with the plugboard. Output lines 181 from the plugboard each representing a particular signal, are connected through the crystal diode array 151 to the translator and also to a shift line, here the numeric line 182. By this arrangement, assuming that at column 4 of the card it is desired that there be punched into the tape a particular signal, such as a card punch skip signal. When the arm of the commutator reaches the tap 4 representing column 4 of the card, a signal will be transmitted over a line 181 and through the crystal diode array 151 to the skip terminal of the translator. The operations that follow will, in the manner as above, effect a shift signal, depending on the previous sensing, and a subsequent punching of the desired signal in the tape.

If in column 4 of the card a character, alpha or numeric, is present, such signal will be first punched into the tape in the usual manner. It will be followed by a shift signal, depending upon the previous sensing, and then punching of the plugboard skip signal into the tape. In this case controls over the drum clutch mechanism are desired to delay the card drum from revolving to the next card position until the desired plugboard signal is punched in the tape. Such controls are symbolized at 190 since any control over the drum clutch, for example relay controls in the line 169, may be utilized and regulated by a proper synchronizing potential associated with the plugboard.

The automatic signal impulse is taken from the commutator 180 which operates in synchronism with the card sensing drum. There are 96 contacts on the distributor for the standard 90 column tabulating card. The 91st contact, equivalent to the 91st column, may be frequently used for carriage return signal. One other contact corresponding to the "zero" column position of the card may be used to give automatic signals prior to reading the card. The four other positions are used for checking the photocells.

The segments of the distributor are all brought out to a plugboard where they may be used for initiating automatic signals. It is possible to have a total of ten different automatic signals.

The automatic signal insertion is as follows:

A negative voltage coming from the distributor plugged to the automatic signal section of the plugboard will cut off the selected amplifier of A81 to A85. Assuming the negative pulse enters A81 the anode potential will rise. The voltage rise through contacts 22*b*, 23*b*, 27*b* will cause conduction of A86 and energize relay 14. The same voltage rise will open gate G87 which permits the delayed synchronous pulse from delay flip-flop F74 to stop the drum and energize relay 7. Relay 7 starts the relay cascade. Relay 11 is energized to cause function table character to be punched provided that relay 8 was not energized which would indicate that the function table character does not require a figure shift signal. If relay 8 has been energized, the proper shift signal would be determined by relay 6 and sent to the punch magnets. Also, relay 10 would become energized and in turn deenergizes relay 8 by resetting trigger T–78.

Whether shift signal is necessary for automatic signal is determined by relay 6. Assuming that the shift signal is necessary, relay 6 will be de-energized and relay 12 energized through contacts 6*b*, 31*a*, 14*a*. Contact 12*a* supplies potential through figure shift line to punch magnet. Another 12*a* contact sends a pulse to shift storage trigger ST75 thereby indicating that a figure shift signal has been punched into the tape. Trigger ST75 changes to the figure position and energizes relay 6 through the amplifier A79. Relay 13 is energized through contacts 6*a*, 14*a* and 15*b*. Contacts 13*a* close to supply potential through neon tubes to punches for insertion of the automatic signal. Relay 15 is energized through contacts 13*a* and locks itself in by means of contact 15*a*. Relay 13 is de-energized by 15*b* contacts and relay 14 is de-energized by 15*b* contacts.

From here on the relay cascade proceeds as originally described in connection with shift signal insertion for function table characters.

If not only a first but also a second automatic signal is required, relay 16 becomes energized in addition to the relays described above. Relay 16 interrupts the sequence in the relay cascade to energize relay 17 and to punch the second automatic signal into the tape.

Relay 31 is for the purpose of by-passing relay 12, thereby causing a selected automatic signal to be punched in the tape without a figure shift signal. The shift characteristic of this selected automatic signal will be the same as the preceding punched character.

*Suppression of information*

Assuming that the information of columns 16 to 23 inclusive shall be suppressed, column 15 of the plugboard will be connected with a "suppress" hub of the board and column 23 with a "punch" hub.

The negative potential from the distributor will proceed through the plugboard through contact 27*b* to drum clutch trigger T76, thereby stopping the sensing drum.

Relay 7 becomes energized and energizes relay 11 and 11*a* contact triggers flip-flop F67 which opens the output gates G53 to G57 and information from translator will be punched.

The relay cascade proceeds as dsecribed above until relay 19 is reached. Relay 19 energizes relay 23 and relay 23 locks itself through contacts 23*a* and 29*b*. Gate $G_{63}$ is closed by contact 23*a*. This will prevent synchronous pulses from reaching the electronic triggers. Relay 19 energizes relay 20 to restart the sensing drum.

For cancelling of suppression (colum 23) the negative pulse from the distributor proceeds through plugboard to drum clutch trigger T76 which will stop the sensing drum. Relay 7 is energized and normal relay sequence in relay cascade takes place until relay 19 is energized. Relay 19 completes a circuit for relay 29. Relay 19 de-energizes relay 23. Relay 29 locks itself through contacts 29*a* and 29*b*. Gate G63 is now open by virtue of contact 23*a* which will permit the synchronous pulse for the subsequent column to go through. Relay 19 energizes relay 20 for restarting the drum clutch.

In Fig. 8 a manual key board 184 connected by suitable plug connectors 185 is provided, whereby any of the tape punch control lines OP–1–5 may be manually controlled.

While the invention has been described and illustrated as above, it is understood that other forms and modifications thereof might suggest themselves to those skilled in the art, and it is our intent, therefore, to claim the invention not only as shown and described but also in all such forms and modifications thereof as may in the spirit of the invention be reasonably construed to be within the scope of the Letters Patent and the appended claims.

What we claim as new, and desire to secure by Letters Patent is:

1. A card to tape code transcribing system, comprising a group of photocells for sensing at one time all the index positions of a record card column for data punched therein in accordance with the permutations of a particular code, there being one photocell assigned to the sensing of each index position, a pair of electronic tube switches assigned to each photocell amplifying means in circuit with each photocell and each pair of tubes for applying current of different polarity to the first grids of said tubes depending upon sensing action of said photocells, a decoder network including pulsing circuit means, synchronized with the register of each card column and the sensing photocells for applying current of one polarity to the second grids of said tubes, and a current supply for the plates of said tubes controlled by said pulsing circuit means, one switch tube of each pair being arranged to transmit a signal of a particular value to the decoder network when a perforated index position is sensed by the related photocell, and the other switch tube of each pair being arranged to transmit a signal of another value to the decoder when no perforation is sensed by the related photocell, the decoder network being effective to elicit one signal from the signals transmitted to it by all the pairs of switches, the signal elicited representing the character originally coded into the card, a neon lamp matrix connected to the output of the decoder for converting the elicited signal into telegraph printer code signals, and means for transcribing the said last mentioned code signals into a tape.

2. A card to tape code transcribing system, comprising a group of photocells for sensing at one time all the index positions of a record card column for an alphabetical or numerical character punched therein in accordance with the permutations of a particular code, there being a separate photocell assigned to the sensing of each index position, a pair of electronic tube switches assigned to each photocell, amplifying means in circuit with each photocell and each pair of tubes for applying current of different polarity to the first grids of said tubes depending upon sensing action of said photocells, a decoder network including pulsing circuit means, synchronized for register of each card column with the sensing photocells for applying current of one polarity to the second grids of said tubes, and a current supply for the plates of said tubes controlled by said pulsing circuit means, one switch tube of each pair arranged to transmit a signal of a particular value to the decoder network when a perforated index position is sensed by the related photocell, and the other switch of each pair arranged to transmit a signal of another value to the decoder when no perforation is sensed by the related photocell; the decoder network being effective to elicit but one signal from the signals transmitted to it by all the pairs of switches, the signal elicited representing the character originally coded into the column of the record card, translator means including a neon isolator matrix connected to the decoder output for converting the elicited signal into signals of a second code, means for transcribing the last mentioned signals into tape perforations, circuits responsive to the decoder network upon a change in the type of characters sensed to delay the transcribing operation, other circuits responsive to the decoded network upon such change to effect transcription of a signal in the tape indicative of a change in the characters being sensed, and further circuits effective upon the last action to disable the delaying circuits and to effect transcription of the translated code signals into the tape.

3. In a card to tape code conversion system, a light controlled card sensing system including electronic tube switching means a decoder of the signals sensed, a translator of the decoded signals into a second code, electromagnetic controlled means for entering data in said transmission circuits connecting the translator to said data entry means, gate circuits responsive to the decoder on sensing a control hole in said card to suppress the transmission of said translated signal to said electromagnetic means, plugboard connections plugable to independent signal circuits, and further circuits and a commutator connected to the plugboard connections and synchronized with the operations of the card sensing system to control the entry in a tape of a preselected independent signal not in a card.

4. In a card to tape conversion system, a card sensing means, means for moving a card past a sensing means, electromagnetic means for entering data in a tape, a plugboard having independent signaling circuits associated therewith, a gate circuit under control of a preselected perforation in said card for controlling said independent signaling circuit, a commutator connected to said plugboard and synchronized with the movement of said card through said sensing system to control the entry of a preselected independent signal not entered in said card, and means for arresting the movement of said card during entry of said independent signal through said plugboard.

5. A device of the character set forth in claim 1 including plugboard signal means having an index position for at least each column of a card being sensed and independent signalling circuits including a relay cascade for controlling the operation of said circuits, an auxiliary neon matrix associated with said neon lamp matrix, and commutator means synchronized with the operation of the card sensing means and in circuit with said plugboard and said auxiliary matrix for controlling entry in said tape of preselected independent plugboard signals not in said card.

6. A device of the character set forth in claim 2 including plugboard means having an index position corresponding to each column of a card being sensed and auxiliary signalling circuits including a relay cascade for controlling the operation of said auxiliary circuits, an auxiliary neon isolator matrix associated with said translator matrix, and commutator means synchronized with the operation of said card sensing means and in circuit with said plugboard and said auxiliary matrix for controlling entry in said tape of a preselected independent plugboard signal not in said card.

7. A device for punching a tape at index positions in accordance with the same five-position code combinations for alphabetical and numerical data including; light controlled means for successively sensing the upper and lower zones of a card in which data, arranged in column by column order, is perforated at index positions in accordance with different six-position code combinations for alphabetical and numerical data, said sensing means presenting a plurality of pairs of photocells, each pair corresponding to the same data index positions in the different card zones; means for moving the card past said sensing means in column by column sequence; a circuit for said sensing means including a pair of switching thyratrons associated with each photocell and a first grid circuit current amplifier means for conditioning each of said thyratrons for conduction; a pulse generator including a relay for supplying a pulse to a second grid circuit common to all of said thyratrons; plate current supply circuits for each of the thyratrons, controlled by said relay, and including decoding means for producing an output line of highest potential indicative of a single character represented by plural perforations sensed in each single column of the card and a neon lamp matrix including output circuits, for translating said single character into five-position tape code representations; and tape punch magnet amplifiers in said output circuits for controlling the perforation of said tape.

8. A device of the character set forth in claim 7 in which said means for moving the card past the sensing means includes a clutch controlled rotary drum slotted to coincide with the columns of data in a card for passing light through the data perforations of the card for impingement on said sensing photocells; and said pulse generating means including a photocell and a rotary disc slotted to pass light to the photocell in synchronism with the activation of said sensing photocells for supplying said second grid circuit pulse and operating said relay to synchronously provide said plate current supply.

9. A device of the character set forth in claim 7, in which said output circuits include gating means; and a circuit connecting the gating means with said pulse generator and including automatic shift means for controlling the operation of said tape punch magnet amplifiers through said gating means.

10. A device of the character set forth in claim 7, in which said output circuits include a drum clutch control magnet and a plurality of punch control magnets; electronic gates conditioned by said neon matrix during code conversion operation and by said pulse generator for supplying a plate potential; and neon isolators for passing operating voltage to selected ones of said magnets when the potential of said gates rises to the necessary supply voltage.

11. A device of the character set forth in claim 7, including a unidirectional crystal diode array between said decoding and translating means for passing a positive pulse, representing a decoded numeral, to a shift inserting signal line including alphabetical and numerical voltage discriminators and flip-flops; a storage trigger intermediate the discriminators and the flip-flops; cathode follower and cut-off amplifier circuits controlled from said flip-flops; shift signal magnet amplifiers for operating punches to automatically punch a shift signal in the tape; diode means for disabling said tape punch magnet amplifiers until one of said flip-flops returns to normal condition; and said cut-off amplifier circuits controlling the operation of said diode means and the said clutch magnet.

12. A device for punching a tape at index positions in accordance with the same five-position code combinations for alphabetical and numerical data including; light controlled means for successively sensing in column by column order the upper and lower zones of a card in which data is perforated at column index positions in accordance with different six position code combinations for alphabetical and numerical data, said sensing means presenting a plurality of pairs of photocells, each pair corresponding to the same data index positions in the different card zones; means for moving the card past said sensing means; a circuit for said sensing means including a pair of switching thyratrons associated with each photocell and a first grid circuit current amplifier means for conditioning each of said thyratrons for conduction; a pulse generator including a relay for supplying a pulse to a second grid circuit common to all of said thyratrons; plate current supply circuits for each of the thyratrons, controlled by said relay, and including decoding means for producing an output line of highest potential indicative of a single character represented by plural perforations sensed in a single column of the card, a translator including output circuits for converting said single character pulse into five-position tape code representations and diode array means intermediate the decoding and translating means; commutator pulsed plugboard controlled relay cascade means in circuit with said diode array; and neon isolator means in circuit with said diode array means and said translator for controlling entry in the tape of data from the card and of data from the plugboard but not in said card.

13. A device of the character set forth in claim 7, including a unidirectional crystal diode array between said decoding and translating means for passing a positive pulse, representing a decoded numeral, to a shift insertion signal line including alphabetical and numerical voltage discriminators and flip-flops; a storage trigger intermediate the discriminators and the flip-flops; cathode follower and cut-off amplifier circuits controlled from said flip-flops; shift signal magnet amplifiers for operating punches to automatically punch a shift signal in the tape; diode means for disabling said tape punch magnet amplifiers until one of said flip-flops returns to normal condition, said cut-off amplifier circuits controlling the operation of said diode means and the said clutch magnet; and manually operated keyboard means for controlling the operation of the tape punch magnets independently of said translator.

14. A device for punching tape at index positions in accordance with a certain code combination including light controlled means for sensing a card in which data is perforated at index positions in accordance with a certain code combination, said sensing means presenting a plurality of pairs of photocells, each pair corresponding to the same data index positions in different card fields; means for moving the card past said sensing means in column by column sequence; a circuit for said sensing means including a pair of switching thyratrons associated with each photocell and a first grid circuit current amplifier means for conditioning each of said thyratrons for conduction; a pulse generator including a relay for supplying a pulse to a second grid circuit common to all of said thyratrons; plate current supply circuits for each of said thyratrons, controlled by said relay, and including decoding means for producing an output line of highest potential indicative of a single character represented by plural perforations sensed in each single column of the card and a neon lamp matrix including output circuits for translating said single character into tape code representations; and tape punch magnet amplifiers in said output circuits for controlling the perforation of said tape.

15. A card to tape code transcribing system, including pairs of photocells for sensing all the index positions of upper and lower zone card columns for data punched therein in accordance with the permutations of a particular code, there being one photocell assigned to the sensing of each index position, a diode decoder network; a set of amplifiers and switches for each pair of photocells, one of each pair of photocells being activated for a single index position to transmit a signal of a particular value to the decoder network when a perforated index position is sensed by the related photocell, and the other tube switch of each pair being arranged to transmit a signal of another value to the decoder when no perforation is sensed by the related photocell, the decoder network being effective to elicit one signal from the signals transmitted to it by the switches, the signal elicited representing the character originally coded in the card, a neon lamp matrix connected to the output of the decoder for converting the elicited signal into telegraph printer code signals, and means for transcribing the said last mentioned code signals into a tape.

16. A card to tape code transcribing system, including pairs of photocells for sensing all the index positions of upper and lower zone card columns for data punched therein in accordance with the permutations of a particular code, there being one photocell assigned to the sensing of each index position, a diode decoder network; a set of amplifiers and switches for each pair of photocells, one of each pair of photocells being activated for a single index position to transmit a signal of a particular value to the decoder network when a perforated index position is sensed by the related photocell, and the other tube switch of each pair being arranged to transmit a signal of another value to the decoder when no perforation is sensed by the related photocell, the decoder network being effective to elicit one signal from the signals transmitted to it by the switches, the signal elicited representing the character originally coded in the card, a neon lamp matrix connected to the output of the decoder for converting the elicited signal into telegraph printer code signals, means for transcribing the said last mentioned code signals into a tape, circuits responsive to the decoder network upon a change in the type of characters sensed to delay the transcribing operation, other circuits responsive to the decoded network upon such change to effect transcription of a signal in the tape indicative of a change in the characters being sensed and further circuits effective upon the last action to disable the delaying circuits and to effect transcription of the translated code signals into the tape.

17. A device of the character set forth in claim 5 wherein said plugboard means includes positions additional to said index positions for controlling entry into the tape of control signals from said additional positions beyond the capacity of the card.

18. A device of the character set forth in claim 6 wherein said plugboard means includes positions additional to said index positions for controlling entry into the tape of control signals from said additional positions beyond the capacity of the card.

References Cited in the file of this patent

UNITED STATES PATENTS

| | | |
|---|---|---|
| 2,139,798 | Bonorden | Dec. 13, 1938 |
| 2,343,405 | Doty | Mar. 7, 1944 |
| 2,534,387 | Thomas | Dec. 19, 1950 |
| 2,534,388 | Shenk et al. | Dec. 19, 1950 |
| 2,564,403 | May | Aug. 14, 1951 |
| 2,570,716 | Rochester | Oct. 9, 1951 |
| 2,604,538 | Halvorsen | July 22, 1952 |
| 2,621,250 | Spencer et al. | Dec. 9, 1952 |
| 2,633,491 | Zentgraph | Mar. 21, 1953 |